United States Patent
Someya (10) Patent No.: US 7,138,784 B2
(45) Date of Patent: Nov. 21, 2006

(54) POSITION COMMAND AND PULSE TIMING COMMAND OPTIMIZATION FOR STEP MOTORS, USING A POSITION SENSOR

(75) Inventor: Masayuki Someya, Braintree, MA (US)

(73) Assignee: Oriental Motor Boston Technology Group Incorporated, Braintree, MA (US)

( * ) Notice: Subject to any disclaimer, the term of this patent is extended or adjusted under 35 U.S.C. 154(b) by 0 days.

(21) Appl. No.: 11/021,241

(22) Filed: Dec. 22, 2004

(65) Prior Publication Data

US 2006/0132080 A1    Jun. 22, 2006

(51) Int. Cl.
*H02P 8/00* (2006.01)

(52) U.S. Cl. .................. 318/696; 318/685; 318/701; 318/568.17; 318/568.18; 318/652; 318/265

(58) Field of Classification Search .............. None
See application file for complete search history.

(56) References Cited

U.S. PATENT DOCUMENTS

| | | | | |
|---|---|---|---|---|
| 3,555,254 A | * | 1/1971 | Gerber | 318/632 |
| 4,710,865 A | * | 12/1987 | Higomura | 700/63 |
| 2004/0135534 A1 | * | 7/2004 | Cullen | 318/609 |
| 2005/0275677 A1 | * | 12/2005 | Spicer | 347/19 |

* cited by examiner

*Primary Examiner*—Lincoln Donovan
*Assistant Examiner*—Erick Glass
(74) *Attorney, Agent, or Firm*—Ira S. Dorman (57) ABSTRACT

Optimized pulse commands are utilized for reducing vibration in a step motor, the optimized commands being created by correcting position, velocity, acceleration, deceleration, and movement distance terms of a basic motion profile with position feedback information generated during operation.

9 Claims, 8 Drawing Sheets

POSITION COMMAND AND PULSE TIMING COMMAND OPTIMIZATION FOR STEP MOTORS, USING A POSITION SENSOR

BACKGROUND OF THE INVENTION

It is often found difficult to control operation of a step motor in accordance with a designed motion profile, due to variations in the velocity requirements and the torque demands to which the motor may be subjected. Pulse generators, or indexers, can be employed to create a variety of profiles for implementing different motion patterns, but such systems do not adequately take load factors into account and commonly require speed and efficiency compromises in order to accommodate unanticipated vibrations. Servo control can be applied to ensure reliable attainment of a commanded rotor or motor load position; however, the dedicated position sensor and algorithm required for servo control, and the need for gain tuning, make such systems expensive and complicated and hence ill-suited for many applications.

SUMMARY OF THE INVENTION

The broad objects of the present invention are to provide a method for optimizing control of a step motor so as to avoid misstepping and undue vibration, and to provide a step motor system having such an optimized control function.

More specific objects of the invention are to provide such a method for optimizing the position command and/or pulse-timing command (referred to collectively herein as pulse commands) for a step motor, and to provide a step motor system having an integrated optimized pulse command function.

It has now been found that certain of the foregoing and related objects of the invention are attained by the provision of a method for controlling movement of a step motor, broadly comprising the steps: defining a motion profile for movement of the step motor rotor through a certain distance and under a certain load; operatively connecting position-sensing means to the rotor to adapt the motor for use as a training tool; impressing successions of energizing pulses upon windings of the so-adapted motor, in accordance with pulse commands dictated by the motion profile, to effect actual operation thereof with the rotor moving through the defined certain distance under the defined certain load; using the position-sensing means to determine the actual position of the rotor at each of a multiplicity of instants during such actual operation; comparing, for each such instant, the actual rotor position determined with the corresponding rotor position established by the defined motion profile; utilizing the comparisons made to create optimized pulse commands for moving the rotor of the training tool through the defined certain distance under the defined certain load; recording the thus optimized pulse commands; and subsequently running a step motor, devoid of position-sensing means, under the control of the recorded, optimized pulse commands.

In certain embodiments of the method the step motor employed will include an operatively connected driver that receives or creates a position command, comprised of a pulse command, for each of a multiplicity of control cycles, with at least one of the instants at which actual position is determined occurring in each control cycle. In other embodiments the step motor will include an operatively connected driver that receives pulses timed in accordance with the pulse command, with timing being modified, as necessary to create optimized pulse commands, at each of the instants at which actual position is determined. The defined motion profile will usually be constructed to control the velocity, acceleration, deceleration, and distance of movement of the rotor, with commanded position, velocity, and acceleration parameters of the defined motion profile being compared in the comparing step with position, velocity and acceleration information obtained in the actual position-determining step.

Other objects of the invention are attained by the provision of a system comprised of a step motor, operated by impressing successions of energizing pulses upon its windings, and a programmed electronic memory component operatively connected to the motor for controlling rotation of its rotor. Programming of the electronic memory component is carried out during operation of the step motor to which the memory component is operatively connected, the same step motor, or an equivalent step motor, having been adapted for use as a training tool by operative connection thereto of position-sensing means. To effect programming of the memory component, actual rotor position is determined at each of a multiplicity of instants during operation of the training tool motor in accordance with a motion profile constructed for moving the rotor through a certain distance under a certain load; actual position of the training tool is compared, for each of those instants, with the corresponding position of the rotor established by the defined motion profile; the comparisons are utilized to create optimized pulse commands for movement of the training tool rotor through the certain distance under the certain load; and the optimized pulse commands are recorded in the electronic memory component.

DETAILED DESCRIPTION OF THE PREFERRED EMBODIMENTS

In practicing the method of invention, a motion profile, constructed in implementation of the intended motor performance (i.e., rotor velocity, acceleration time, deceleration time and motion distance), is first designed for the step motor utilized, based upon conventional position command or pulse-timing factors. Depending upon whether the motor driver employed is one that receives timed pulses directly, or instead receives or creates a position command, either the proper timing, or the proper position command for each control cycle, is calculated.

With a position sensor attached to the rotor shaft, or to the load itself, the step motor (thus adapted as a training tool) is operated in accordance with the designed motion profile. Position feedback data (and/or velocity and acceleration feedback data derived by differentiation of the position term) are obtained from the position sensor (and associated servo control algorithm) and are compared to the position, velocity and/or acceleration commands comprising the designed motion profile. Summations of the errors in each compared term are utilized to correct the timing or determine the next position command for the motor.

A pulse train is then generated to drive the system further, or a position command is generated to drive the system in the next control cycle, and the sequence is repeated so as to thereby generate an optimized timing scheme, or optimized position commands, for controlling movement of the rotor throughout the entire travel distance. The optimized control information is recorded (e.g., in the system memory), and is ultimately used to drive the same step motor, devoid of the position sensor and control algorithm, or to drive another such motor of identical or equivalent characteristics.

Figure 1:
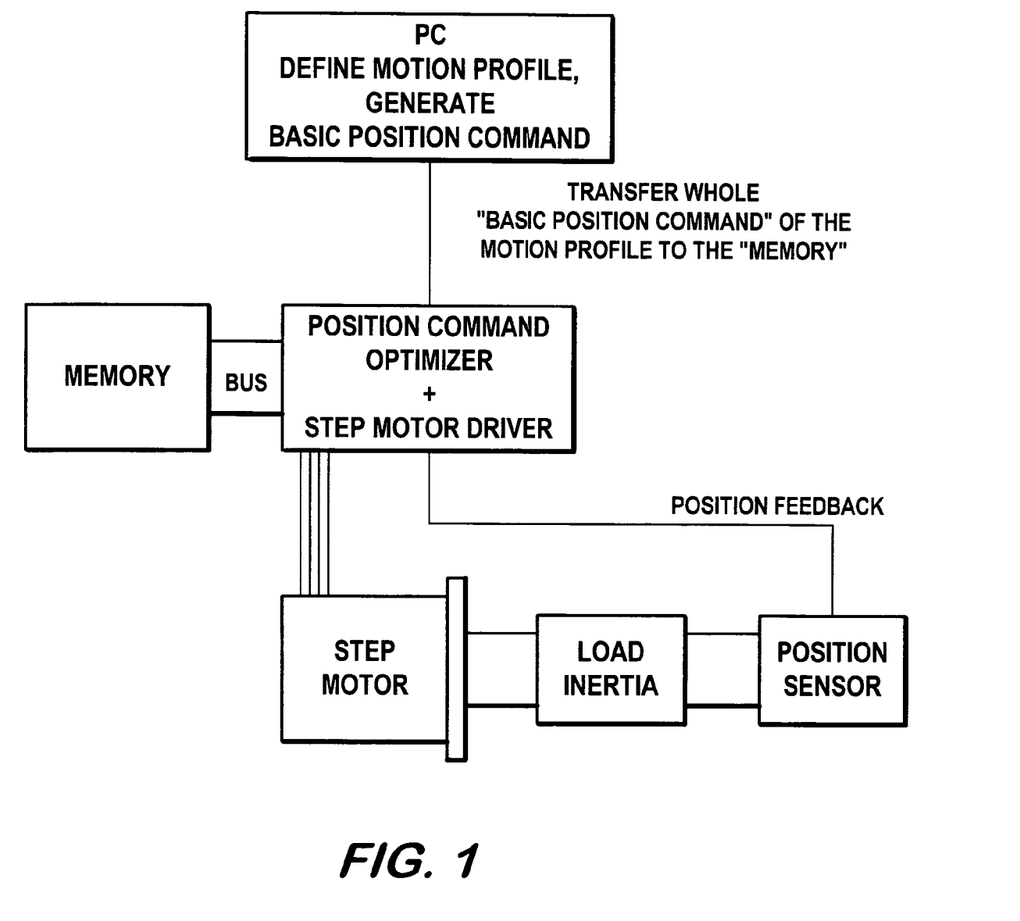
FIG. 1 is a block diagram depicting a system by which the position command for a step motor is optimized in accordance with the present invention.

Turning now in detail to FIG. 1 of the drawings, in the step motor system depicted position commands, rather than pulse commands, are employed directly for the sake of simplicity. As noted above, at the commencement of the procedure a motion profile is defined for moving the rotor of the motor through the required distance, and is utilized for generating a basic position command, which is stored in the memory of the motor system. The motor is then operated, utilizing the basic position command, and the actual position of the rotor is fed back from the position sensor during each cycle of operation, with rotor velocity and acceleration being calculated from each position term. An optimized position command for each cycle is in turn calculated from the errors (i.e., the deviations between the commanded and measured performance) in the position, velocity and acceleration terms, and is utilized to drive the motor through the succeeding cycle. (It might be noted that, because the load inertia and position sensor are rigidly attached to the motor shaft, the position, velocity and acceleration of the rotor, of the load inertia, and of the position sensor are assumed to be the same; if there were flexibility in the motor-to-load connection, the position sensor would be attached rigidly to the load.)

Figure 2:
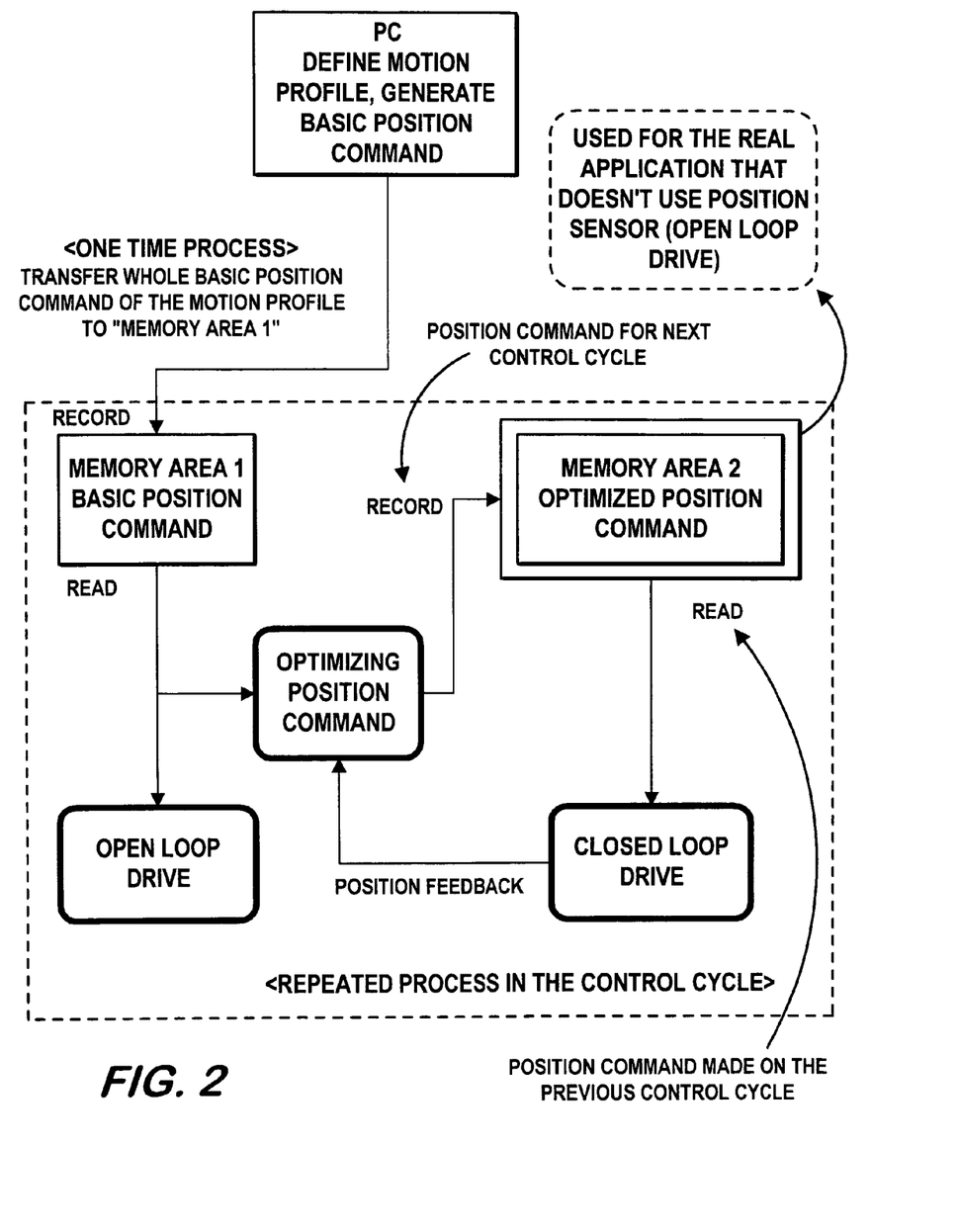
FIG. 2 is a schematic diagram depicting the sequence of operations involved in creating and utilizing an optimized position command in accordance with the invention.
Figure 3:
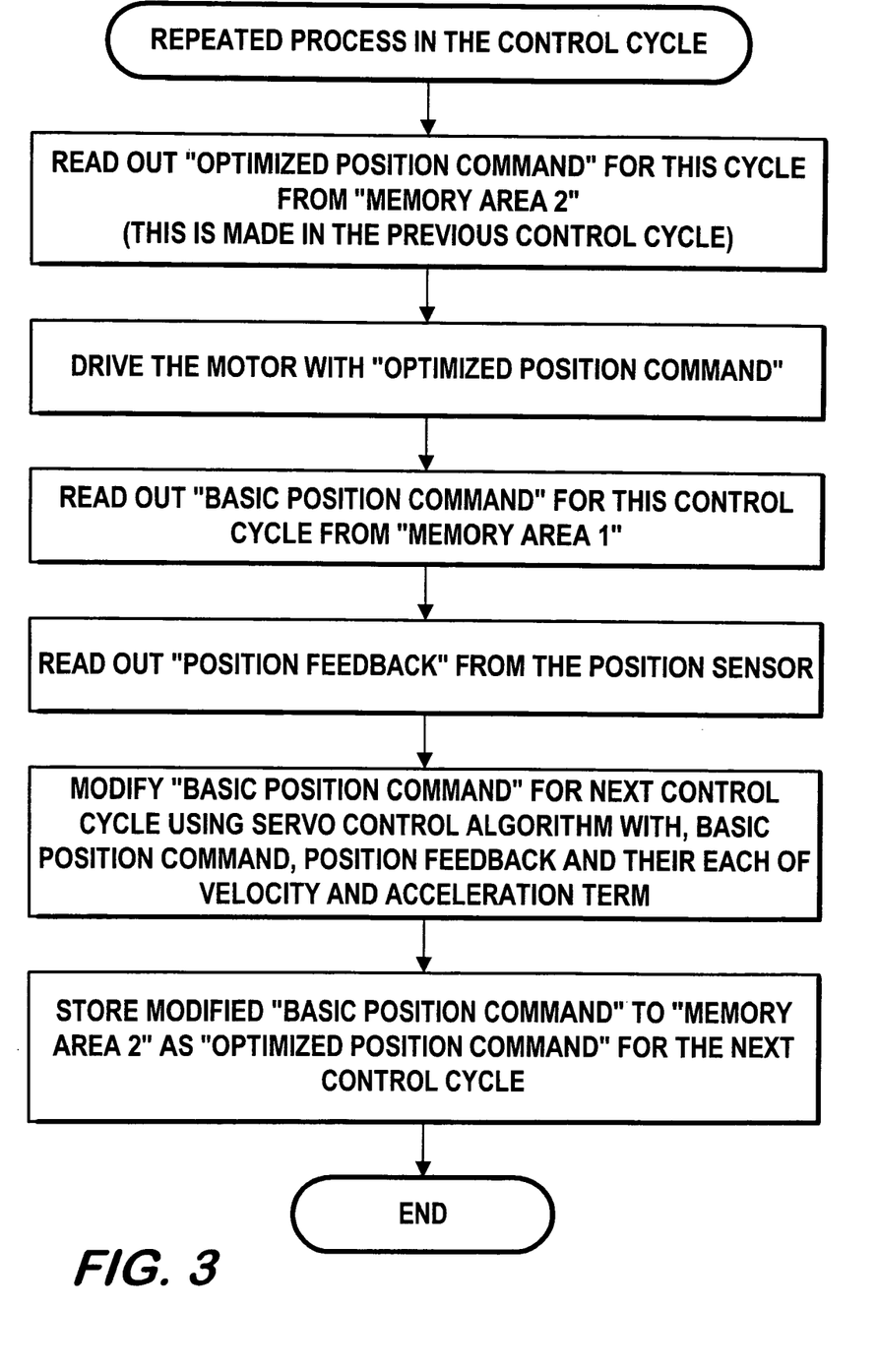
FIG. 3 is a flow diagram illustrating the steps by which a position command is optimized through numerous cycles of operation of a step motor.

As seen in FIGS. 2 and 3, an appropriate motion profile is calculated utilizing suitable electronic data processing means ("PC") based upon acceleration torque, time and velocity constraints. A position command for each control cycle of the motor is calculated from the motion profile, and is stored in "Memory Area 1" as the basic position command. With the motor running in closed loop (training) mode, in accordance with the defined motion profile, actual position information fed back from the position sensor, and the basic position commands read from Memory Area 1, are utilized for determining an Optimized Position Command, which is stored in Memory Area 2 and is used for commutating the motor in the succeeding control cycle. The foregoing operations are repeated for each control cycle until an optimized position command has been established for the entire travel distance of the rotor; as will be appreciated, the first control cycle will not be affected because no prior optimized position command is available. It will also be appreciated from FIG. 2 that the accumulated optimized position commands stored in Memory Area 2 are utilized for driving the step motor in open loop mode, with the position feedback components removed or disconnected, in a working (real) application.

Figure 4:
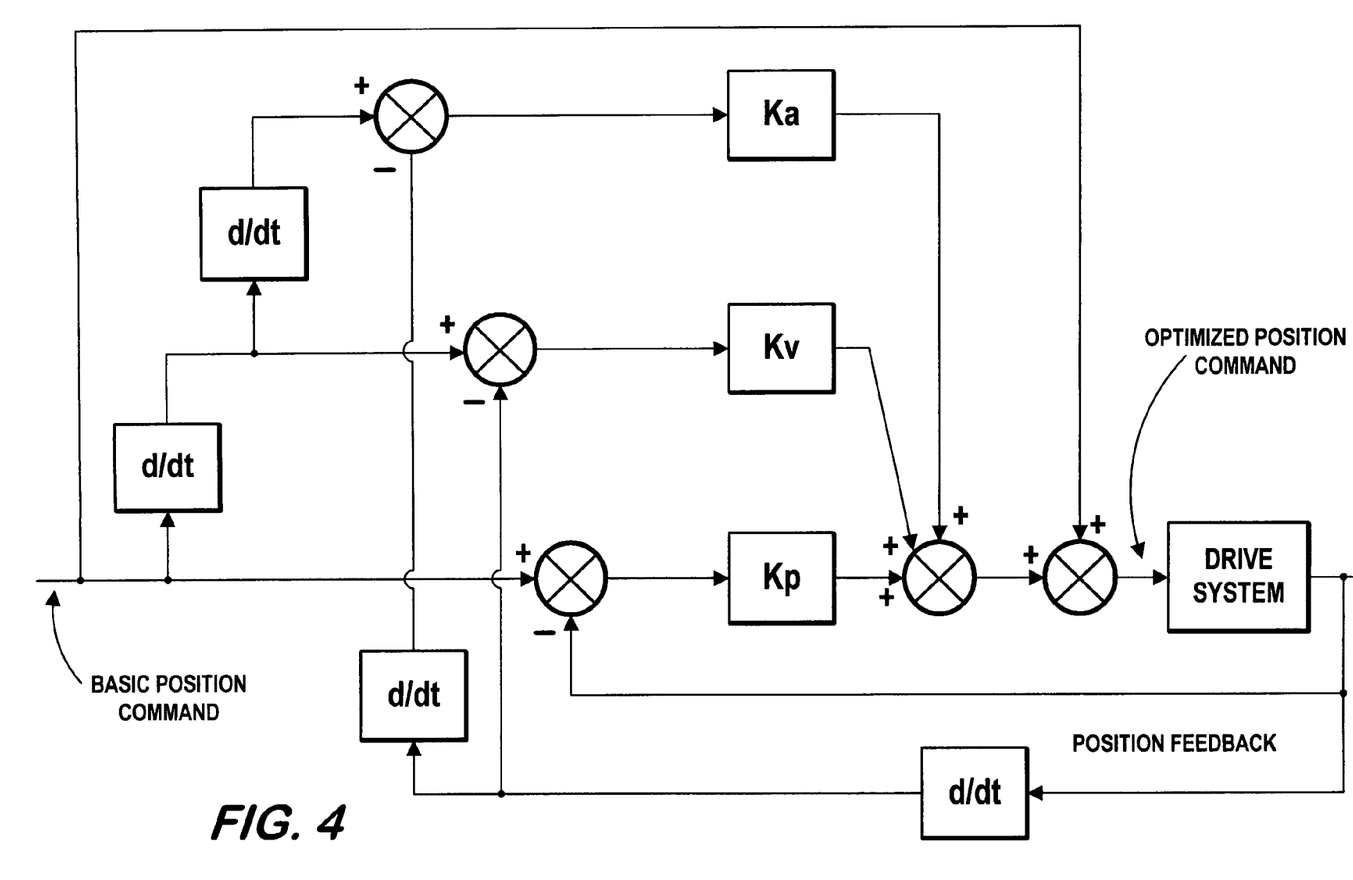
FIG. 4 is a block diagram depicting a method for determining optimized position commands.

FIG. 4 depicts the method used to determine the optimized position command, in accordance with which velocity and acceleration are calculated as the differentials of position and velocity values, respectively, for both the basic position command utilized and also the position feedback information obtained. The error for each position, velocity, and acceleration term is calculated, and multiplied by the gain. The products are summed, and the totals (positive or negative) are added to the basic position command for the control cycle for which the determinations are being made, with the result constituting an optimized position command for the subsequent control cycle. Needless to say, other algorithms can be employed to determine optimized position commands, as will be evident to those skilled in the art.

Figure 5:
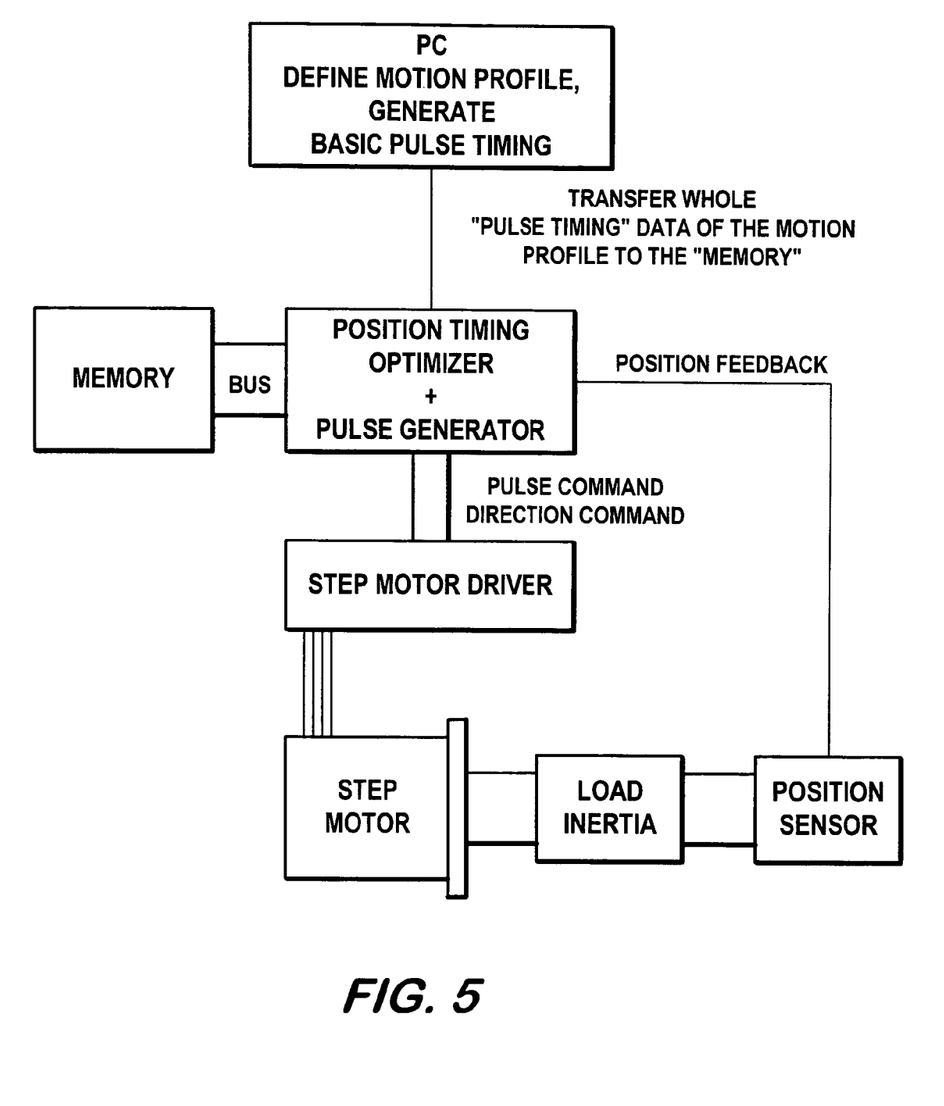
FIG. 5 is a block diagram, similar to FIG. 1, depicting a system embodying the present invention and utilized for defining a motion profile for a driver of the pulse-driven type; and Each of FIGS. 6 through 10 presents a set of three scans representative of motor velocity variation, the first scan of each set showing performance under the control of a basic position command, the second scan of each set showing performance of the motor during the optimization process, and the third scan showing performance of a step motor controlled utilizing the optimized pulse command produced.

FIG. 5 of the drawings is a block diagram similar to the diagram of FIG. 1 but for a pulse-driven type step motor system rather than a system in which position command is used directly; consequently, the pulse command is transmitted to the step motor system in the form of a pulse timing instruction. Apart from the fact that the system of this Figure utilizes a pulse timing optimizer and a pulse generator rather than a position command optimizer, therefore, it is analogous in all respects to the system depicted in FIG. 1.

As seen in FIG. 5, the pulse timing optimizer reads out the pulse timing instructions from the system memory, and reads out position feedback from the position sensor, utilizing the latter to calculate velocity and acceleration terms and, in turn, to calculate optimized pulse timing. A pulse train is generated based upon the thus-determined optimized pulse timing, and the driver utilizes the received pulse command to drive the motor. It should be appreciated that a reverse motion pulse can occur with optimized pulse timing, even when the system is running at high speed; accordingly, as indicated in FIG. 5, the direction input is of importance. Here again, however, any suitable algorithm for pulse timing optimization and/or conversion can be employed.

EXAMPLES

The following examples demonstrate that vibration of a step motor is reduced by optimizing either the timing of pulses or the position command, in accordance with the present invention, and that the same improvement is obtained even when the optimized pulse command is applied in the absence of position feedback. In all instances hereinafter described position resolution is 5000 pulses per revolution and velocity data are obtained using a tachometer.

In each of the following figures the trace at the left represents the velocity response that results when either the basic (i.e., non-optimized) position command or pulse timing instruction is employed; the trace in the center shows the velocity response that occurs in the course of the optimization procedure (i.e., with position feedback); and the right-hand trace shows the velocity response that results when the optimized pulse command is used alone (i.e., with no position sensor operatively connected).

Figure 6:
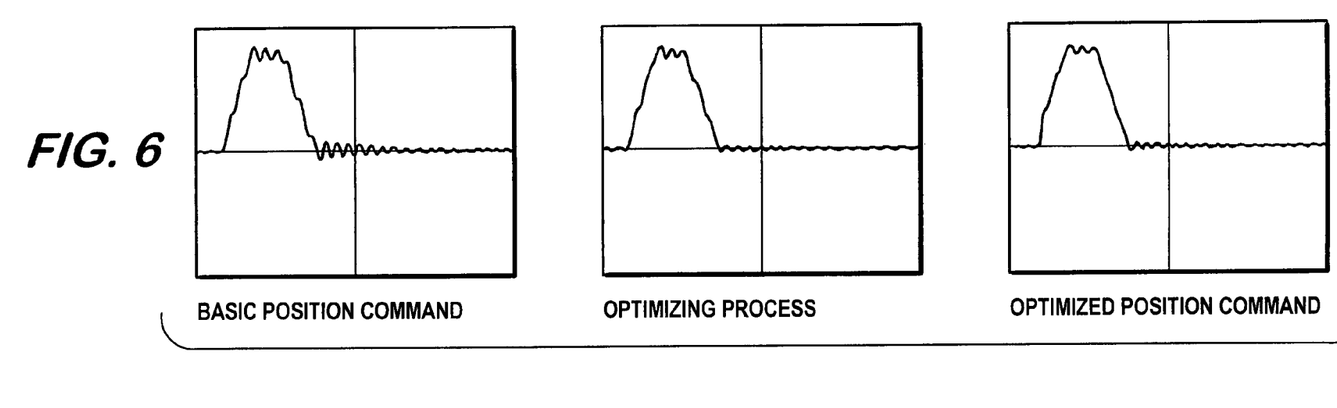
Figure 7:
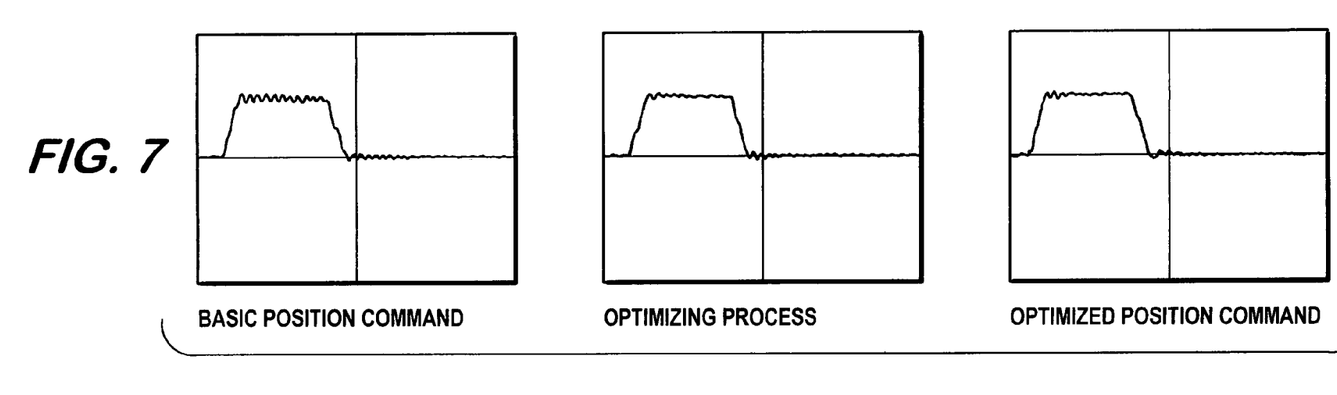

More specifically, FIG. 6 depicts the velocity response of the step motor system described in connection with FIGS. 1 through 4, wherein the rotor movement distance is one revolution the acceleration and deceleration times are each 50 milliseconds, the running velocity is 10 revolutions per second, and the load inertia is 4976 $gcm^2$. The traces comprising FIG. 7 were generated utilizing the same system and conditions, but with a load inertia of 2306 $gcm^2$ applied.

Figure 8:
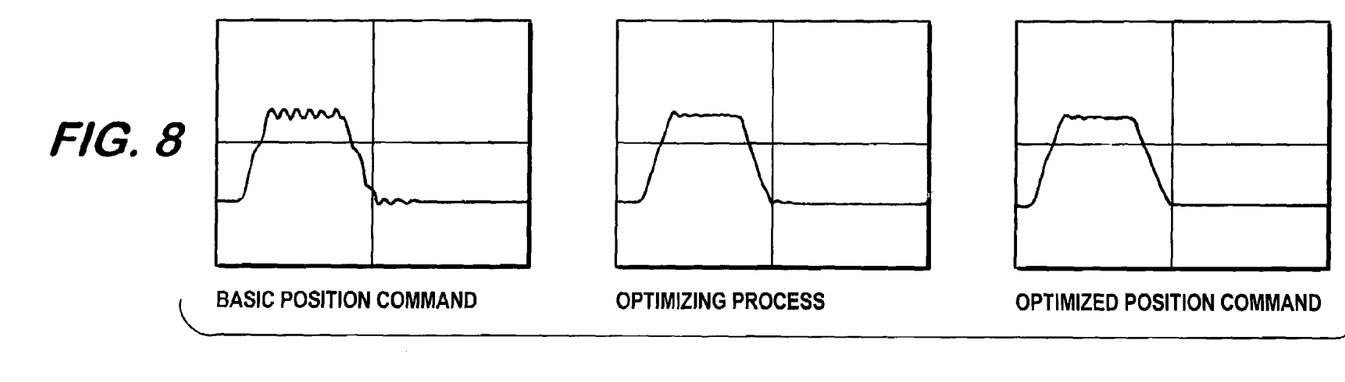
Figure 9:
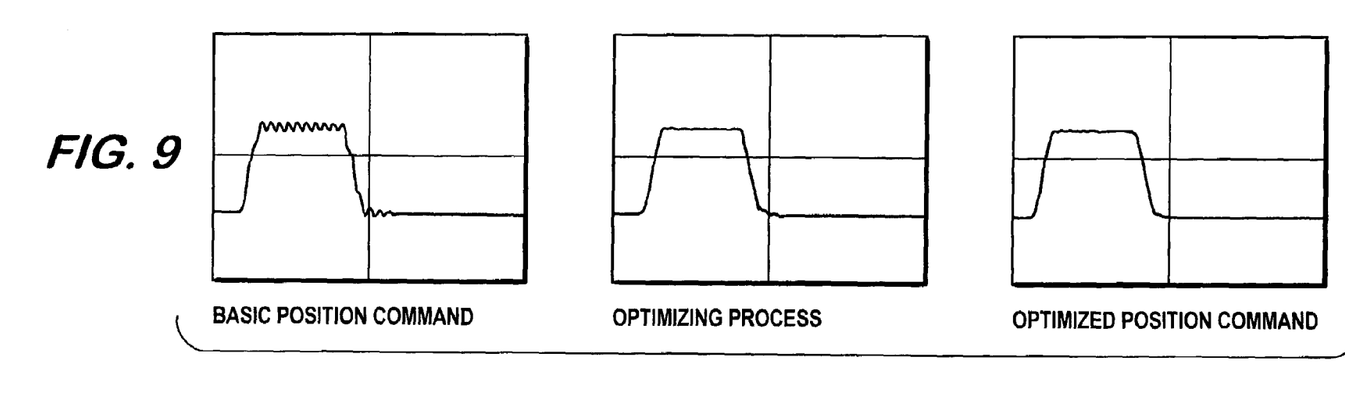
Figure 10:
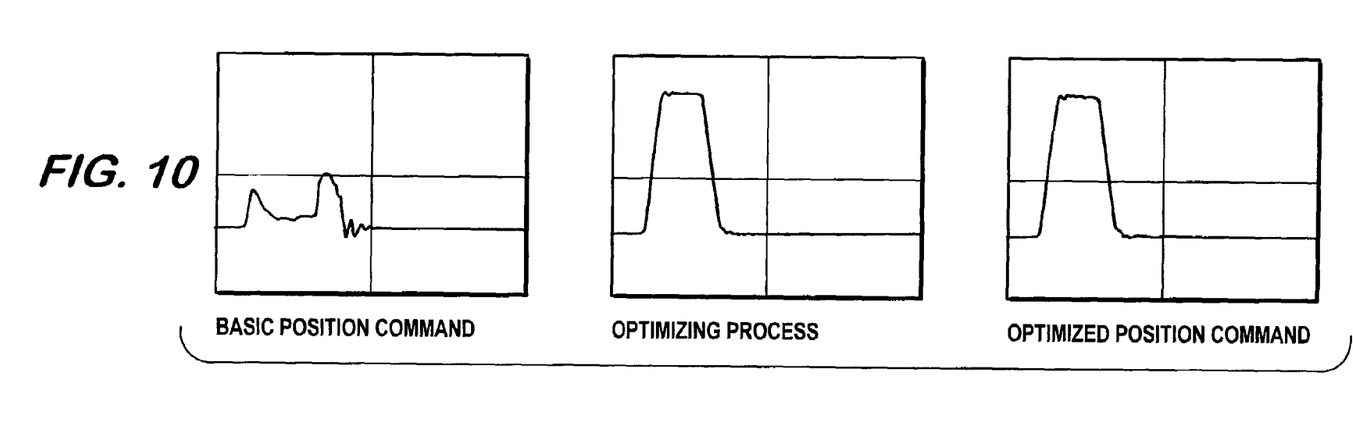

FIGS. 8 through 10 depict the velocity characteristics of the step motor system described in connection with FIG. 5. The traces of FIG. 8 were generated with the rotor moving through a distance of one revolution, with acceleration and deceleration times of 50 milliseconds, with a running velocity of six revolutions per second, and with a load inertia of 4096 gcm$^2$ applied. The traces of FIG. 9 were again generated over a motion distance of one revolution but with acceleration and deceleration times of 30 milliseconds each, a running velocity of six revolutions per second, and load inertia of 2,306 gcm$^2$. The same operating conditions produced the traces of FIG. 10, except that the running velocity was ten revolutions per second and the load inertia was 1302 gcm$^2$.

As can be seen from the foregoing examples, the response represented by each center trace and right-hand trace was better than the response represented by the corresponding left-hand trace; indeed, it is highly significant that the responses of the center and right-hand traces are almost identical to one another in each example. It is also notable that a missing step occurs in the basic pulse-timing response represented in FIG. 10, but that the motor ran without the missing step, and with almost no vibration, under optimized pulse command control (both with and without the position sensor operatively connected).

Thus, it can be seen that the present invention provides a method for optimizing control of a step motor so as to avoid misstepping and undue vibration, as well as a step motor system having such an optimized control characteristic. More specifically, the invention provides a method for optimizing the position command and/or the pulse-timing for a step motor, as well as providing a step motor system into which such optimized pulse commands are integrated.

Having thus described the invention, what is claimed is:

1. A method for controlling movement of a step motor having a rotor, so as to reduce vibration during operation, said method comprising the steps:
    defining a motion profile for movement of said step motor rotor through a certain distance and under a certain load;
    operatively connecting position-sensing means to said rotor to adapt said step motor for use as a training tool;
    impressing, in accordance with regular pulse commands dictated by said defined motion profile, successions of energizing pulses upon windings of said training tool to effect actual operation of said training tool, in a multiplicity of successive control cycles, with said rotor moving through said certain distance under said certain load;
    using said position-sensing means to determine the actual position of said rotor at each of a multiplicity of instants during said actual operation of said training tool;
    comparing, for each of said instants, the determined actual position of said rotor with the corresponding rotor position established by said defined motion profile;
    utilizing said comparisons to determine a position error term, a velocity error term, and an acceleration error term;
    utilizing said position error term, said velocity error term, and said acceleration error term to create an optimized pulse command for moving said rotor of said training tool in a subsequent control cycle;
    recording said optimized pulse commands created during movement of said training tool through said certain distance under certain load; and
    subsequently running a said step motor, devoid of said position-sensing means, under the control of said recorded, optimized pulse commands.

2. The method of claim 1 wherein said step motor includes an operatively connected driver that receives or creates a position command, comprised of a said regular pulse command, for each of said multiplicity of control cycles; and wherein at least one of said instants at which said actual position is determined occurs in each of said control cycles.

3. The method of claim 1 wherein said step of recording produces a programmed electronic memory component, and wherein said programmed memory component is utilized for said subsequently running step.

4. A method for controlling movement of a step motor having a rotor, so as to reduce vibration during operation, said method comprising the steps:
    defining a motion profile for movement of said step motor rotor through a certain distance and under a certain load;
    operatively connecting position-sensing means to said rotor to adapt said step motor for use as a training tool;
    impressing, in accordance with regular pulse commands dictated by said defined motion profile, successions of energizing pulses upon windings of said training tool to effect actual operation of said training tool, in a multiplicity of successive control cycles, with said rotor moving through said certain distance under said certain load;
    using said position-sensing means to determine the actual position of said rotor at each of a multiplicity of instants during said actual operation of said training tool;
    comparing, for each of said instants, the determined actual position of said rotor with the corresponding rotor position established by said defined motion profile;
    utilizing said comparisons to determine a position error term, a velocity error term, and an acceleration error term;
    utilizing said position error term, said velocity error term, and said acceleration error term to create an optimized pulse command for moving said rotor of said training tool in a subsequent control cycle;
    recording said optimized pulse commands created during movement of said training tool through the remainder of said certain distance under said certain load; and
    subsequently running a said step motor, devoid of said position-sensing means, under the control of said recorded, optimized pulse commands; said step motor including operatively connected means for pulse timing optimization and pulse generation, which receives timed pulses; said regular pulse commands dictating the timing of said pulses; and the timing of pulses being modified, as necessary to create said optimized pulse commands, at each of said instants at which said actual position is determined and found to be different from said corresponding rotor position established by said defined motion profile.

5. A method for controlling movement of a step motor having a rotor, so as to reduce vibration during operation, said method comprising the steps:
    defining a motion profile for movement of said step motor rotor through a certain distance and under a certain load;
    operatively connecting position-sensing means to said rotor to adapt said step motor for use as a training tool;
    impressing, in accordance with regular pulse commands dictated by said defined motion profile, successions of energizing pulses upon windings of said training tool to effect actual operation of said training tool, in a multiplicity of successive control cycles, with said rotor moving through said certain distance under said certain load;

using said position-sensing means to determine the actual position of said rotor at each of a multiplicity of instants during said actual operation of said training tool;

comparing, for each of said instants, the determined actual position of said rotor with the corresponding rotor position established by said defined motion profile;

utilizing said comparisons to determine a position error term, a velocity error term, and an acceleration error term;

utilizing said position error term, said velocity error term, and said acceleration error term to create an optimized pulse command for moving said rotor of said training tool in a subsequent control cycle;

recording said optimized pulse commands created during movement of said training tool through said certain distance under said certain load; and subsequently running a said step motor, devoid of said position-sensing means, under the control of said recorded, optimized pulse commands; said defined motion profile being constructed to control rotor velocity, rotor acceleration, rotor deceleration, and rotor revolution distance and comprising commanded position, commanded velocity, and commanded acceleration terms, said commanded position, commanded velocity and commanded acceleration terms of said defined motion profile being compared in said comparing steps, respectively, with position, velocity and acceleration information obtained in said actual position-determining step.

6. A step motor system comprised of a step motor having a rotor, and a programmed electronic memory component operatively connected for controlling rotation of said rotor for movement through a certain distance and under a certain load, in accordance with a defined motion profile, operation of said motor being effected by impressing successions of energizing pulses upon windings thereof; said programmed memory component of said motor system being the product of a programming procedure carried out with an electronic memory component operatively connected to a said step motor modified for use as a training tool, during operation thereof in accordance with said defined motion profile, said training tool modification comprising operative connection of position-sensing means to a said step motor; said programming procedure comprising:

impressing, in accordance with regular pulse commands dictated by said defined motion profile, successions of energizing pulses upon windings of said training tool to effect actual operation of said training tool, in a multiplicity of successive control cycles, with said rotor moving through said certain distance under said certain load;

determining from said position-sensing means the actual position of said training tool rotor at each of a multiplicity of instants occurring during operation of said training tool in accordance with said defined motion profile;

comparing, for each of said instants, the determined actual position of said training tool rotor with the corresponding position of said training tool rotor established by said defined motion profile;

utilizing said comparisons to determine a position error term, a velocity error term, and an acceleration error term;

utilizing said position error term, said velocity error term, and said acceleration error term to create an optimized pulse command for movement of said training tool rotor in a subsequent control cycle; and recording said optimized pulse commands, created during movement of said training tool through said certain distance under said certain load, in said memory component to create said programmed electronic memory component.

7. The system of claim 6 wherein said step motor includes an operatively connected driver that receives or creates a position command, comprised of a said regular pulse command, for each of said multiplicity of control cycles; and wherein at least one of said instants at which said actual position is determined occurs in each of said control cycles.

8. A step motor system comprised of a step motor having a rotor, and a programmed electronic memory component operatively connected for controlling rotation of said rotor for movement through a certain distance and under a certain load, in accordance with a defined motion profile, operation of said motor being effected by impressing successions of energizing pulses upon windings thereof; said programmed memory component of said motor system being the product of a pro-gramming procedure carried out with an electronic memory component operatively connected to a said step motor modified for use as a training tool, during operation thereof in accordance with said defined motion profile, said training tool modification comprising operative connection of position-sensing means to a said step motor: said programming procedure comprising:

impressing, in accordance with regular pulse commands dictated by said defined motion profile, successions of energizing pulses upon windings of said training tool to effect actual operation of said training tool, in a multiplicity of successive control cycles, with said rotor moving through said certain distance under said certain load;

determining from said position-sensing means the actual position of said training tool rotor at each of a multiplicity of instants occurring during operation of said training tool in accordance with said defined motion profile;

comparing, for each of said instants, the determined actual position of said training tool rotor with the corresponding position of said training tool rotor established by said defined motion profile;

utilizing said comparisons to determine a position error term, a velocity error term, and an acceleration error term;

utilizing said position error term, said velocity error term, and said acceleration error term to create an optimized pulse command for movement of said training tool rotor in a subsequent control cycle; and recording said optimized pulse commands in said memory component to create, during movement of said training took through said certain distance under said certain load, said programmed electronic memory component; said step motor including operatively connected means for pulse timing optimization and pulse generation, which receives timed pulses; said regular pulse commands dictating the timing of said pulses; and the timing of pulses being modified, as necessary to create said optimized pulse commands, at each of said instants at which said actual position is determined and is different from said corresponding rotor position established by said defined motion profile.

9. A step motor system comprised of a step motor having a rotor, and a programmed electronic memory component operatively connected for controlling rotation of said rotor for movement through a certain distance and under a certain load, in accordance with a defined motion profile, operation of said motor being effected by impressing successions of energizing pulses upon windings thereof; said programmed memory component of said motor system being the product of a pro-gramming procedure carried out with an electronic memory component operatively connected to a said step motor modified for use as a training tool, during operation thereof in accordance with said defined motion profile, said training tool modification comprising operative connection of position-sensing means to a said step motor: said pro-gramming procedure comprising:

impressing, in accordance with regular pulse commands dictated by said defined motion profile, successions of energizing pulses upon windings of said training tool to effect actual operation of said training tool, in a multiplicity of successive control cycles, with said rotor moving through said certain distance under said certain load;

determining from said position-sensing means the actual position of said training tool rotor at each of a multiplicity of instants occurring during operation of said training tool in accordance with said defined motion profile;

comparing, for each of said instants, the determined actual position of said training tool rotor with the corresponding position of said training tool rotor established by said defined motion profile;

utilizing said comparisons to determine a position error term, a velocity error term, and an acceleration error term;

utilizing said position error term, said velocity error term, and said acceleration error term to create an optimized pulse command for movement of said training tool rotor in a subsequent control cycle; and recording said optimized pulse commands in said memory component to create, during movement of said training tool, through said certain distance under said certain load, said programmed electronic memory component; said defined motion profile being constructed to control rotor velocity, rotor acceleration, rotor deceleration, and rotor revolution distance and comprising commanded position, commanded velocity, and commanded acceleration terms; and said commanded position, commanded velocity and commanded acceleration terms of said defined motion profile being compared in said compairing steps, respectively, with position, velocity and acceleration information obtained in said actual position-determining step.

* * * * *